United States Patent
Behrens

[11] Patent Number: 5,836,107
[45] Date of Patent: Nov. 17, 1998

[54] MULTI-LAYERED VEGETATION ELEMENT

[76] Inventor: Wolfgang Behrens, Trespenmoor 25, D-27243, Gross Ippener, Germany

[21] Appl. No.: 776,245
[22] PCT Filed: Jun. 18, 1996
[86] PCT No.: PCT/DE96/01114
   § 371 Date: Jan. 24, 1997
   § 102(e) Date: Jan. 24, 1997
[87] PCT Pub. No.: WO97/01687
   PCT Pub. Date: Jan. 16, 1997

[30] Foreign Application Priority Data

Jun. 28, 1995 [DE] Germany .................. 195 23 406.5

[51] Int. Cl.[6] ................................................ A01C 1/04
[52] U.S. Cl. ........................................ 47/56; 47/59
[58] Field of Search ................... 67/59, 66, 82, 67/83, 56

[56] References Cited

U.S. PATENT DOCUMENTS

| 4,318,248 | 3/1982 | Muldner | 47/56 |
| 5,390,442 | 2/1995 | Behrens | 47/59 |
| 5,608,989 | 3/1997 | Behrens | 47/65.9 |
| 5,724,766 | 3/1998 | Behrens | 42/56 |

FOREIGN PATENT DOCUMENTS

| 0337085 | 10/1989 | European Pat. Off. | 47/83 |
| 000485277A | 5/1992 | European Pat. Off. | 47/56 |
| 2552620 | 4/1985 | France | 47/56 |
| 2630293 | 10/1989 | France | 47/56 |
| 3400696 | 7/1985 | Germany | 47/56 |
| 3631716 | 3/1988 | Germany | 47/56 |
| 3805069 | 9/1989 | Germany | 47/56 |
| 3003731 | 1/1988 | Japan | 47/56 |
| 1290338 | 9/1972 | United Kingdom | 47/56 |
| 2221134 | 1/1990 | United Kingdom | 47/56 |

Primary Examiner—Michael J. Carone
Assistant Examiner—Arpad F. Kovacs
Attorney, Agent, or Firm—Burns, Doane, Swecker & Mathis, L.L.P.

[57] ABSTRACT

Multi-layered vegetation element for the greening of large rooftops, with the individual layers being mechanically interconnected by threads. A porous fibrous web is envisaged as the lowest layer, followed by a layer of stone wool and a layer incorporating seeds and living plant matter. A retention layer or protective layer serves as the uppermost layer. As an alternative embodiment, the porous fibrous web at the bottom is followed by a layer of mineral wool, which in turn is topped by a mixed cocos and plant layer being a cocos layer with an admixture of seeds and living plant matter.

19 Claims, 2 Drawing Sheets

MULTI-LAYERED VEGETATION ELEMENT

The invention relates to a multi-layered vegetation element for the greening of artificial level expanses such as rooftops or other areas, in particular for the greening of large areas such as the greening of large industrial rooftops.

Due to its positive aspects, the greening of artificial level expanses and in particular the greening of rooftops of buildings has long been proven and popular. Generally speaking, in the case of large areas, greening by spray-on application is considered, with a green compound being sprayed onto the rooftop in situ. Apart from this method it is also well known to place rolls of ready-made precultivated vegetation mats on the roof where they are unrolled and laid. The present invention deals with this alternative to spray-on greening.

In practical operation the vegetation mats are precultivated on natural soil by the manufacturer. According to German patent DE 36 31 716 C2 and German patent DE 42 19 275 C2, with prior art the procedure is as follows. A sealing foil is spread out on the natural soil and a support structure for the vegetation is placed on top of this foil. The foil seals the support structure so as to prevent root penetration into the natural soil, of the plants to be cultivated.

Subsequently, substrate, seed, plant matter and fertiliser are placed onto or into the support structure, and then shade cloth is applied (protection against sun and wind).

Then follows an extensive period of horticultural care, watering and fertilising the plants until the support structure is completely green and available for use as a ready-made vegetation mat for greening a rooftop. It can take several months until the vegetation mats have completely greened and until the pre-cultivation period is completed. Only then can the vegetation mats be used for greening a roof.

Apart from the extensive pre-cultivation period it is also disadvantageous that the vegetation mats must be produced for inventory buildup and kept in the manufacturer's care until such time as an order for the greening of a roof is obtained. Only then are the vegetation mats rolled up and transported to the desired destination. A further disadvantage in this respect is that the rolls of precultivated, ready-made vegetation mats are very heavy, resulting in high freight costs.

At their destination, the heavy rolls of vegetation mats must be taken onto the roof and placed in their final position. In these processes too, the heavy weight of the rolls of vegetation mats is not compatible with ease of use.

If on the other hand, no customer is found for the readymade vegetation mats, there is the additional disadvantage of the entire pre-cultivated mats having to be cared for over an ever increasing period and, in the worst case, even becoming unusable. Due to the extensive pre-cultivation period it is not always possible to produce the vegetation mats on demand. Rather, the manufacturer has to bear the risk of pre-financing cultivation of vegetation mats.

It is an object of the invention to provide a vegetation element which avoids the above-mentioned disadvantages to the manufacturer and makes it possible to produce the vegetation elements to firm requirements and both to manufacture and lay them onto the desired area within a short time.

To achieve this object, the multi-layered vegetation element comprises the characteristics mentioned in the subsidiary claims 1 and 2.

An essential characteristic of the invention consists of the vegetation element which comprises several mechanically interconnected layers, apart from seeds also containing an admixture of living plant matter. While seeds require a relatively long growth phase, the living plant matter grows considerably faster. In addition, the application of living plant matter means independence from seed production.

The use of living plant matter is to be seen in the context of the particular layered construction of the vegetation element and also in the context of the seeds. In the alternative embodiment according to claim 1 the upper retaining layer, which serves as a protective layer, of the vegetation element takes on a particular role. Not only does this retaining layer stop the plant matter or the seeds from being blown away by the wind, but rather this retaining layer on top of the plant matter ensures ground contact with the layer of mineral wool located below the living plant matter. The upper retaining layer presses the plant matter against the mineral wool layer, thus improving root formation.

Of course, the use of living plant matter is only possible with certain types of plants, e.g. with succulents. Due to the simultaneous use of seeds and plant matter, restriction to the same type of plant is recommended. In this case, the seeds serve as a safety backup and reserve, in case not all plant matter grows completely. But it is also conceivable to use parts of one type of plant and seeds from another, different type of plant, together.

In the alternative embodiment according to the alternative independent claim 2 the lowest layer of fibrous web is directly beneath a layer of mineral wool and on top of this layer there is a mixed cocos and plant layer made from a cocos layer with an admixture of seeds and living plant matter. Thus this cocos layer already incorporates, as ingredients, the seeds and the living plant matter which may also partly lay on top of the cocos layer.

In practice, the above-mentioned cocos and plant layer acts both as a growth layer and as a retaining layer. The growing roots can penetrate down into the layer of mineral wool.

A decisive advantage of the invention consists of the pre-cultivation period as mentioned in the introduction not being applicable at all. Instead, it is possible to produce the vegetation elements according to the invention based on actual demand and order position.

A further essential aspect of the invention arises from the vegetation element not containing any substrate and thus in addition also being comparatively light. The substrate which is still essential for complete greening of the roof is first placed on the roof, with the vegetation element according to the present invention being subsequently rolled out for placement upon it.

Care must be taken that the vegetation elements according to the present invention have to be placed within the relatively short time of about two days, otherwise there is the danger of the living plant matter spoiling. For, in the rolled-up state for transport to the site, warmth and humidity can easily develop in the vegetation elements and besides, there is hardly any light. Consequently, the living plant matter may spoil to the point of becoming unusable if these factors exist for an extended period or if transportation takes too long.

Because pre-cultivation is no longer required, the costs of lengthy care are avoided and the disadvantage of possible overproduction for inventory buildup no longer applies. Rather, the possibility now exists of manufacturing the vegetation elements according to the present invention immediately upon receipt of an order, and of laying it within a short time on site on a roof where a substrate is in place.

Since there is no extended pre-cultivation period or since there is no substrate involved, the new vegetation elements are relatively light; only around 20% of the weight of ready-made greened and pre-cultivated vegetation mats. Accordingly, freight costs are considerably reduced.

The low weight of the vegetation elements leads to still further advantages. Handling, both at the place of manufacture and in particular at the destination, is much simpler and vegetation elements can be laid quickly. It is not even absolutely necessary that these tasks be accomplished by an expert. This results in considerable financial benefits.

To be sure, it may become necessary to water the vegetation elements in the initial phase, but this factor is far outweighed by the above-mentioned advantages.

The invention is particularly favourable when greening large areas, such as large roofs of industrial buildings. Here, the advantages mentioned apply in particular, and above all the invention represents a cost-effective alternative to spray-on greening which is in itself quite competitively priced.

Starting point of the invention was the object of avoiding expensive and time-consuming pre-cultivation by producing, to firm requirements, vegetation elements which would be ready for use within a very short time on a roof where a substrate is in place. When compared to seeds, the living plant matter grows very quickly and once these new types of vegetation elements are in position on the roof, the seed can germinate in situ while the living plant matter already assures a first flush of greenery. The invention is particularly favourable in the case of larger areas, from approx 5,000 m². With such expanses the advantages mentioned, such as low freight costs, rapid placement and the absence of any pre-cultivation period, are particularly noticeable.

Yet another particular advantage of the invention is the use of mineral wool, for example stone wool, because the mineral wool serves as a water-retaining layer. Water capacity is about 95%, i.e. the mineral wool can absorb and retain water at the rate of 95% of its weight. It is thus sufficient, after placement on the roof of the vegetation element according to the invention or rather on the substrate in place on the roof, to provide one watering in order to bring about growth.

In addition, the mineral wool becomes heavy as a result of the water absorbed by it and thus makes a beneficial contribution to positional safety of the vegetation element on the roof, until the roots of the developing plants have penetrated the substrate.

An appropriate embodiment of the invention also envisages the addition of fertiliser to the plant layer containing the living plant matter and seed. The substrate of the vegetation element which practically consists of the lower layer of cocos and the mineral wool layer, can be regarded as being largely nutrient-neutral. In addition, the layer of mineral wool assumes a fire protection role. Preferably rock wool is used as mineral wool.

In the case of the invention, nutrient-neutral means that hardly any nutrients available to the plants are present, so that the addition of slow-release nutrients may become necessary, preferably as organic nutrient combinations or so-called coated fertiliser. The plants can thus grow initially, but before long there would be insufficient nutrients to ensure further growth or further nutrient supply to the plants. It is therefore recommended to add such fertiliser.

According to another appropriate embodiment of the invention, the living plant matter consists of sprouts of the genus Sedum which have proven to be particularly suitable and which grow quickly.

In the two alternative embodiments of the invention according to the alternative independent claims 1 and 2, additionally, woven mesh is used to advantage as the uppermost layer on top of the vegetation element. This woven mesh is to have sufficiently large mesh openings and is to be mechanically interconnected to all other layers of the vegetation element, preferably by threads in the manner of a quilt. Thus the vegetation element as a whole forms a stable entity.

The woven mesh provides the advantage of enabling abutting or adjoining widths or lengths of the vegetation element to be fastened, i.e. interconnected. The adjoining or abutting mats or vegetation elements can thus form one overall unit.

The woven mesh provides the additional advantage of counteracting the danger of wind suction forces.

Further advantageous developments of the invention are listed in the dependent claims.

BRIEF DESCRIPTION OF THE SEVERAL VIEWS OF THE DRAWINGS

The objects and features of the invention will be better understood from the embodiments represented in the accompanying drawings in which.

DESCRIPTION OF THE PREFERRED EMBODIMENTS

Figure 1:
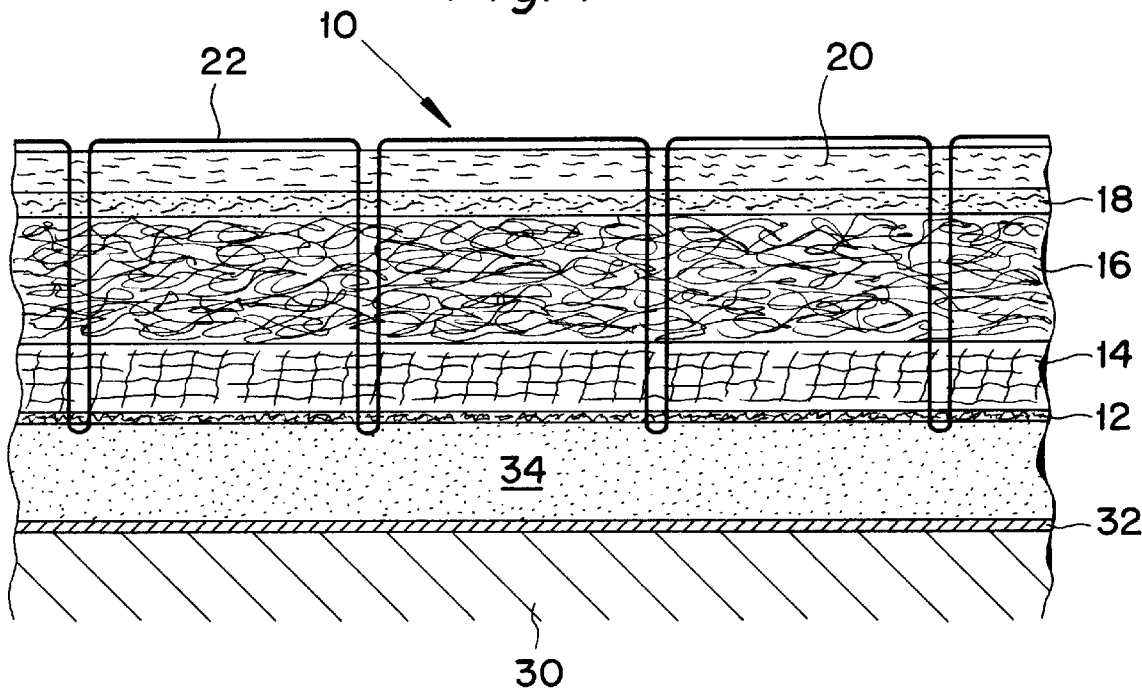
FIG. 1 is a diagrammatic cross-sectional view of a vegetation element according to a first alternative embodiment of the invention.

The vegetation element shown in FIG. 1 is a multi-layered vegetation mat 10 that can be rolled up. A porous fibrous web 12 serves as the lowest layer in a manner which is well known. On top of it there is a lower layer 14 made from cocos, with an approximate thickness in this embodiment of about 1.0 cm.

On top of the lower layer 14 made from cocos there is a stone wool layer 16, approximately 2.0 cm thick. On top of the stone wool layer 16 there is a vegetation layer 18 comprising seeds and living plant matter. This is a growth layer for growing vegetation, in this embodiment comprising the plant genus Sedum. The seed too, is Sedum seed, and Sedum sprouts are used as living plant matter. In addition, the vegetation layer 18 contains fertiliser (repository fertiliser for approximately 6 months).

The multy-layered construction of the rollable vegetation mat 10 is finished off by an upper retaining layer 20 consisting of cocos material. The retaining layer 20 serves as a protective layer and prevents removal of living plant matter and seeds by the wind. In addition, the retaining layer ensures ground contact of the living plant matter to the stone wool layer 16, i.e. the living plant matter is to some extent pressed against this stone wool layer 16 thus promoting root growth.

The layers of the rollable vegetation mat are held together by threads 22 in a manner of a quilt and thus mechanically interconnected so as to provide the required stability and cohesion.

The thickness of the lower layer 14 made from cocos is about 1.0 cm, that of the mineral wool layer 16 approximately 2.0 cm and that of the retaining layer at the top 20 about 0.3 cm.

The following dimensions for the strips of rollable vegetation mats 10 of FIG. 1 can be considered suitable: length 12.0 m; width 1.0 m; total thickness approx. 3.3–3.5 cm—a unit delivered thus consists of 12 m². Weight at delivery is a mere 2.0 kg/m². Each unit delivered of 12 m² thus weighs 24.0 kg, very lightweight indeed.

When greening a roof it is envisaged that a sealing layer 32 be applied to the roof 30, and a substrate layer 34 be placed on top of this sealing layer 32. Finally, the rollable vegetation mat 10 is laid or rolled out on top of this substrate layer 34.

Figure 2:
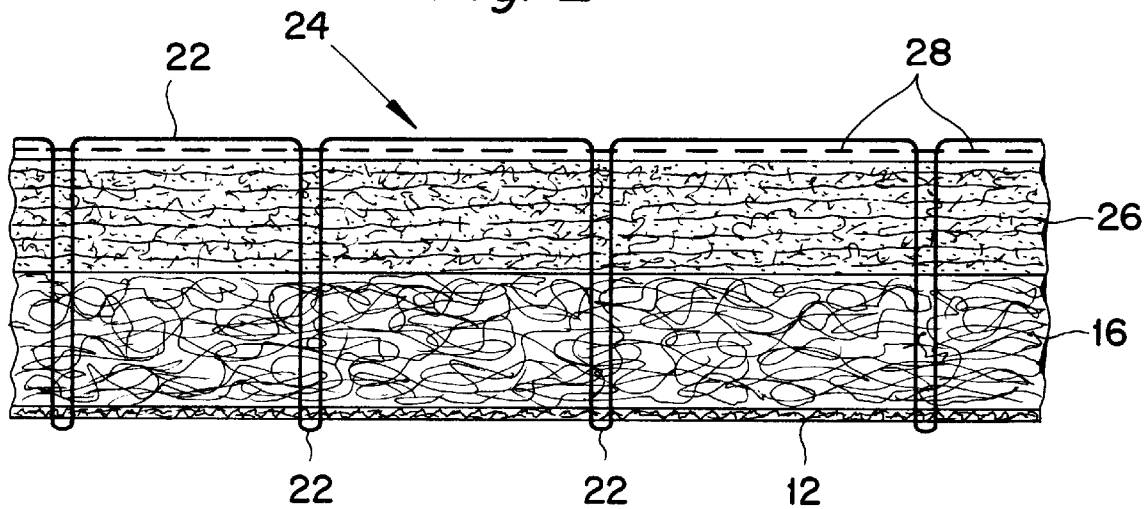
FIG. 2 is a diagrammatic cross-sectional view of a vegetation element according to a second alternative embodiment of the invention.

In the case of the rollable vegetation mat 24 shown without a roof in FIG. 2, the mineral wool layer 16, here too preferably made from stone wool, is placed directly onto the lower layer of fibrous web 12. The lower cocos layer 14, shown in FIG. 1, is thus not present.

On top of the mineral wool layer 16 there is a mixed cocos and plant layer 26 made from a cocos layer mixed with seeds and living plant matter. Seeds and living plant matter may partly also be located on top of this cocos and plant layer 26. As with the rollable vegetation mat according to FIG. 1, fertiliser may also be added to the cocos and plant layer 26.

Here the cocos and plant layer 26 acts both as a growth layer and a retaining layer (as described in the case of FIG. 1). In the embodiment shown, the thickness of the layer of cocos and plant matter is about 1.5 cm; the weight per unit of area is 500 g/m².

When compared to the rollable vegetation mat 10 shown in FIG. 1, the vegetation mat 24 enables even more regular and intensive plant growth, because plant matter and seeds can develop better and more evenly inside the cocos and plant layer 26.

Above the cocos and plant layer 26 there is a woven mesh 28 which may also be provided in the case of the alternative embodiment according to FIG. 1. The woven mesh 28 has been stitched together by threads 22 with the other layers of the rollable vegetation mat 24, thus providing protection from wind suction forces. This is advantageous in cases where the rollable vegetation mats 10 or 24 are used at a higher level, for example on roofs, where there is a danger of the rollable vegetation mats or their layers being lifted off by wind suction forces and blown away.

The rollable vegetation mat 10 or 24 can be produced very quickly on demand, without a pre-cultivation period, and subsequently handled within only about 48 hours and rolled out on a roof 30 to be greened, where a substrate 34 is in position.

Once the rollable vegetation mat 10 or 24 according to the present invention has been laid onto the roof 30, it may take about 3–8 weeks of cultivation time until the rollable vegetation mat 10 or 24 is completely greened.

By way of supplement it should be noted that the lower layer 14 made from cocos, as shown in FIG. 1 can assume a drainage function. In addition, the plant roots are able to reach into this lower layer 14 made from cocos.

The cocos or cocos material used within the framework of this invention may comprise cocos fibres of various length or of cocos mulch or cocos peat, preferably bound, e.g. as a mat.

Figure 3:
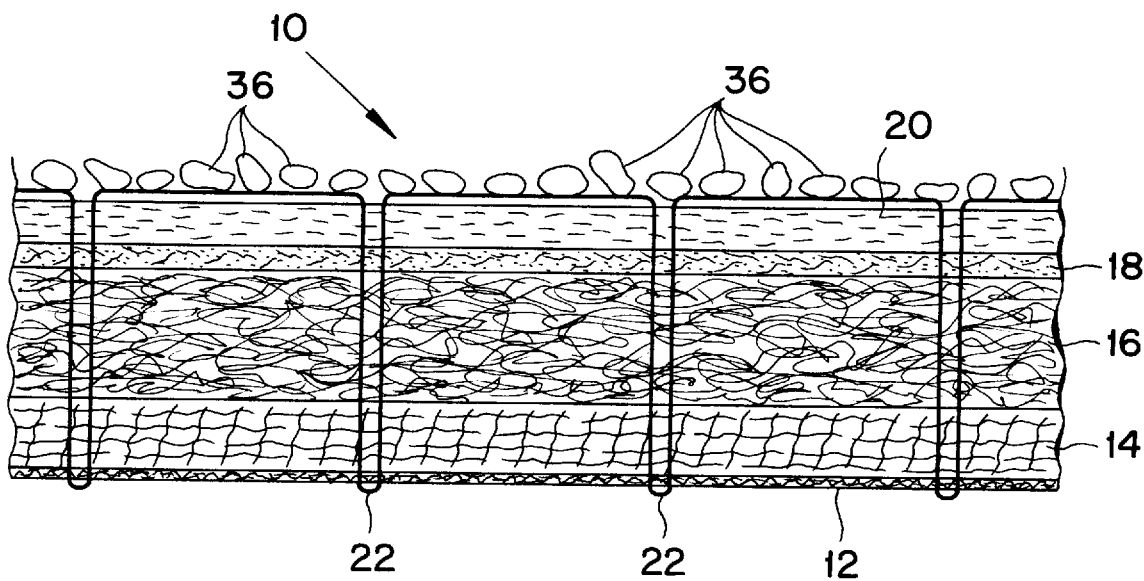
FIG. 3 is a view of a vegetation element according to FIG. 1 with an upper layer of gravel or pebble stones.

As a further embodiment of the invention, FIG. 3 depicts a rollable vegetation mat 10 according to FIG. 1, except that in addition a thin layer of gravel or pebble stones 36 has been placed on top of the surface of the rollable vegetation mat 10. This thin layer of gravel or pebble stones 36 serves to weigh down the rollable vegetation mat 10 (or 24) and by increasing its overall weight enhances its positional safety. This counteracts the danger of the rollable vegetation mat 10 being lifted off the rooftop as a result of wind suction forces.

In addition, the layer of gravel or pebble stones 36 is beneficial in assisting growth during dry weather, because humidity accumulating at night can be stored underneath the individual pieces of gravel.

Besides, the individual stones which form the layer of gravel or pebble stones are only visible during the cultivation period. As the plants grow and the greenery takes over, the layer of gravel or pebble stones is covered up by the plants.

As an alternative to the thin layer of gravel or pebble stones, the top of the rollable vegetation mat 10 or 24 may be fitted with wires or wire mesh coated in clay. In this way too, the rollable vegetation mat 10 or 24 can be weighed down to ensure increased positional safety.

FIG. 1–3 shows the vegetation elements 10 before the greenery has taken over.

I claim:

1. A rollable multi-layered vegetation element (10) for the greening of artificial level expanses with the individual layers being mechanically interconnected, comprising the following design of the individual layers, from bottom to top:

a porous fibrous web (12) as the lowest layer,
a lower layer (14) made from cocos,
a mineral wool layer (16) made from mineral wool,
a vegetation layer comprising seeds and living plant matter (18),
an upper retaining layer (20) as a protective layer.

2. Vegetation element according to claim 1, characterized in that the thickness of the vegetation layer is approx. 1.5 cm and the weight per unit or area is 500 g/square-meter.

3. Vegetation element according to claim 1, characterized in that the vegetation layer (18) additionally contains fertilizer.

4. Vegetation element according to claim 1, characterized in that the upper retaining layer consists of cocos material and is only approx. 0.3 cm thick and weighs only approx. 25 g/square-meter.

5. Vegetation element according to claim 1, characterized in that the living plant matter consists of succulent plants.

6. Vegetation element according to claim 1, characterized in that the living plant matter consists of Sedum sprouts.

7. Vegetation element according to claim 6, characterized in that the seeds and the living plant matter is the same type of plant.

8. Vegetation element according to claim 1, characterized in that the total thickness of the vegetation element (10) is about 3.3 to 3.5 cm.

9. Vegetation element according to claim 1, characterized in that on top of the upper retaining layer a thin layer of gravel or pebble stones has been placed.

10. Vegetation element according to claim 1, characterized in that on the top of upper retaining layer wires or a wire mesh coated in clay have been placed.

11. A rollable multi-layered vegetation element (10) for the greening of artificial level expanses with the individual layers being mechanically interconnected, comprising the following design of the individual layers, from bottom to top:

a porous fibrous web (12) as the lowest layer,
a mineral wool layer (16) made from mineral wool,
a mixed cocos and plant layer (26), made from a cocos layer mixed with seeds and living plant matter.

12. Vegetation element according to claim 11, characterized in that the thickness of the mixed layer of cocos and plant matter (26) is approx. 1.5 cm and the weight per unit of area is 500 g/square-meter.

13. Vegetation element according to claim 11, characterized in that as a further upper layer of a woven mesh (28) is superimposed on top of the mixed cocos and plant layer, and the woven mesh is mechanically interconnected with the layers below.

14. Vegetation element according to claim 13, characterized in that the woven mesh (28) of abutting and adjoining vegetation elements are mechanically interconnected.

15. Vegetation element according to claim 11, characterized in that the mixed cocos and plant layer (26) additionally contains fertilizer.

16. Vegetation element according to claim 11, characterized in that the living plant matter consists of succulent plants.

17. Vegetation element according to claim 11, characterized in that the living plant matter consists of Sedum sprouts.

18. Vegetation element according to claim 17, characterized in that the seeds and the living plant matter is the same type of plant.

19. Vegetation element according to claim 10, characterized in that the total thickness of the vegetation element (10) is about 3.3 to 3.5 cm.

* * * * *